Oct. 11, 1966 H. RUBE 3,278,098
FILM TRANSPORTING MECHANISM
Filed March 29, 1965 2 Sheets-Sheet 1

INVENTOR
HELMUT RUBE
by
*Michael J. Striker*
his ATTORNEY

Oct. 11, 1966    H. RUBE    3,278,098
FILM TRANSPORTING MECHANISM
Filed March 29, 1965    2 Sheets-Sheet 2

INVENTOR
HELMUT RUBE
by
Michael J. Striker
his ATTORNEY

United States Patent Office 3,278,098
Patented Oct. 11, 1966

3,278,098
FILM TRANSPORTING MECHANISM
Helmut Rube, Endersbach, Germany, assignor to Eugen Bauer G.m.b.H., Stuttgart-Unterturkheim, Germany
Filed Mar. 29, 1965, Ser. No. 443,520
Claims priority, application Germany, Apr. 11, 1964, B 76,290
17 Claims. (Cl. 226—70)

The present invention relates to a film transporting mechanism for motion-picture cameras. More particularly, the invention relates to improvements in claw pulldown for intermittently advancing the film in cameras and projectors. Still more patricularly, the invention relates to an improved film transporting mechanism of the parallel-motion type wherein a toothed claw travels in an endless path to enter the perforations of a film strip and to advance the same while travelling in a predetermined portion of its path.

A serious drawback of presently utilized claw pulldowns is that the mechanism is subjected to excessive wear which results in parasitic noise and affects the quality of reproduction. Also, the components of such conventional mechanisms must be machined with utmost precision which results in higher initial and maintenance cost of the apparatus wherein the pulldown is put to use.

It was already proposed to provide a claw pulldown with two or more heart-shaped or otherwise configurated cams one of which determines the outline of the path for the claw and another of which effects such movements of the claw which result in engagement with and disengagement from the film strip. Such constructions are very complicated and thus prone to malfunction, especially if the mechanism is operated at high speed.

Accordingly, it is an important object of the present invention to provide a very simple, rugged and compact film transporting mechanism which can be operated at very high speeds and wherein the wear on movable parts cannot affect the quality of reproduction and produces negligible noise.

Another object of my invention is to provide a film transporting mechanism wherein all movements of the claw are initiated by a single cam and wherein the cam may resemble an asymmetric body. This results in highly improved registration of the image area on the film strip with the aperture and in superior lighting efficiency.

A further object of the invention is to provide a film transporting mechanism whose claw is capable of properly engaging and advancing a film strip even if the component parts of the mechanism are not machined with utmost precision and even if certain movable parts undergo considerable wear on extended use of the mechanism in a projector or camera.

An additional object of the invention is to provide an improved bearing structure for and an improved coupling between the claw-supporting levers of a parallel-motion type film transporting mechanism.

A concomitant object of the invention is to provide a film transporting mechanism wherein the position of the claw with reference to the film strip may be adjusted in a simple and time-saving manner.

Still another object of the invention is to provide the film transporting mechanism with wear-resistant and practically noiseless pressure- and motion-transmitting parts, and to construct the mechanism in such a way that each of its parts is readily accessible for the purposes of inspection, repair and/or replacement.

Briefly stated, one feature of my invention resides in the provision of a film transporting mechanism which may be mounted in the housing of a film projector or camera. The mechanism comprises a support which is preferably adjustable with reference to the housing. The support is connected with two combined pivot and swivel bearings each of which carries one end portion of a swing lever. The other end portions of the levers carry a film-engaging claw which may be provided with one or more teeth capable of entering the perforations in a film strip. A single cam is adjacent to the median portions of the levers and is provided with two cam faces one of which causes the levers to move the claw in an endless path a portion of which is located in the plane of the film and the other of which causes the teeth of the claw to penetrate into or to be withdrawn from the perforations. The median portions of the levers are operatively connected to each other by a pin-and-slot coupling.

In accordance with a more specific feature of my invention, one of the levers carries one or more small projections which come in actual contact with the other lever so that the friction between the two levers is reduced to a minimum. Resilient means, preferably in the form of helical expansion or torsion springs, are used to bias the levers against each other, to bias one of the levers against one of the cam faces and to bias the pin of the pin-and-slot coupling against the other cam face.

The claw may resemble a toothed plate which is provided with a cutout to receive the respective end portions of the swing levers, and the mechanism comprises additional resilient means for biasing the claw-supporting portions of the levers away from each other. Such additional resilient means may be mounted in one of the bearings, and this one bearing is constructed and assembled in such a way that the corresponding lever may rotate about two axes which are normal to each other and that the lever is also free to oscillate in response to or against the bias of the additional resilient means.

The novel features which are considered as characteristic of the invention are set forth in particular in the appended claims. The improved film transporting mechanism itself, however, both as to its construction and its mode of operation, together with additional features and advantages thereof, will be best understood upon perusal of the following detailed description of a specific embodiment with reference to the accompanying drawings, in which:

Figure 1:
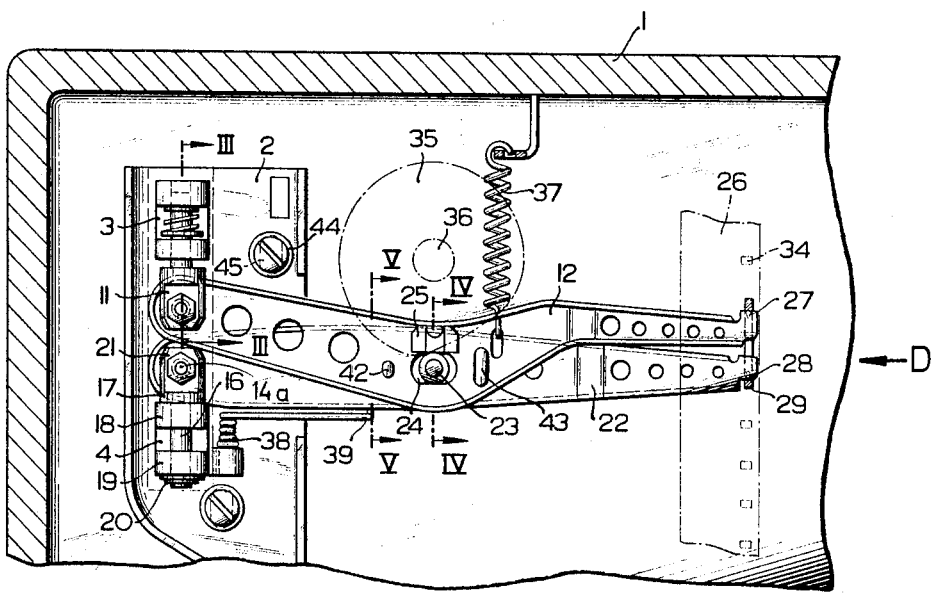
FIG. 1 is a vertical section through the housing of a motion-picture apparatus embodying a film transporting mechanism which is constructed and assembled in accordance with my invention, the mechanism being shown in a front elevational view.
Figure 3:
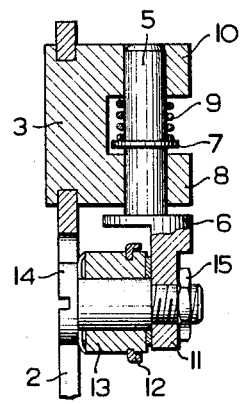
FIG. 3 is an enlarged fragmentary vertical section as seen in the direction of arrows from the line III—III of FIG. 1, and illustrates the combined pivot and swivel bearing for one of the swing levers.

FIG. 1 shows the housing 1 of a motion-picture apparatus. The inner side of one wall of the housing 1 is connected with a U-shaped support 2 for two combined pivot and swivel bearings 3 and 4. The bearing 3 includes a pivot 5 which is rotatable and axially movable with respect to a pair of eyes 8, 10. Axial movements of the pivot 5 are limited by a first stop in the form of a flange 6 (see FIG. 3) and by a second stop in the form of a ring 7. The ring 7 is located in the space between the eyes 8 and 10. A helical spring 9 surrounds the pivot 5 and operates between the upper eye 10 and the ring 7 whereby the flange 6 tends to move away from the underside of the eye 8. In other words, the spring 9 tends to keep the ring 7 in abutment with the upper side of the eye 8. The lower part of the flange 6 is integral with an eye 11 for a second pivot 14 which is retained by a nut 15 and whose axis is normal to the axis of the pivot 5. The pivot 14 carries one end portion 13 of a first swing lever 12. The end portion 13 is shown as a separate part and resembles a sleeve which is mounted to swivel on a median portion of the second pivot 14. The swing lever 12 may be pivoted about the axis of the pivot 5, it can swivel about the axis of the pivot 14, and this lever 12 also shares all axial oscillatory movements of the pivot 5.

The bearing 4 includes a rotary pivot 16 and two axially spaced eyes 18, 19. A flange 17 at the upper end of the pivot 16 abuts against the upper side of the eye 18, and the lower end portion of this pivot 16 extends beyond the underside of the lower eye 19 and carries a ring-shaped stop 20. The upper end portion of the flange 17 constitutes an eye 21 for a pivot 14a which supports one end portion of a second swing lever 22. The connection between the end portion of the swing lever 22 and the pivot 14a is analogous to the connection between the pivot 14 and swing lever 12. The swing lever 22 is free to swivel about a horizontal axis defined by the pivot 14a and this lever is pivotable about the axis of the pivot 16.

Figure 2:
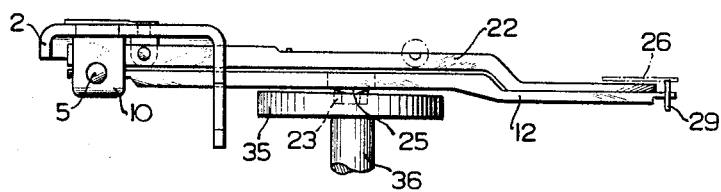
FIG. 2 is a top plan view of the film transporting mechanism.
Figure 4:
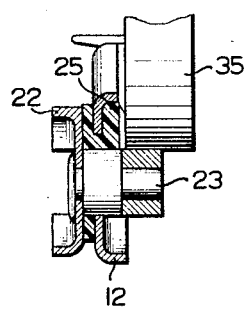
FIG. 4 is an enlarged fragmentary vertical section as seen in the direction of arrows from the line IV—IV of FIG. 1.

The swing lever 22 carries a pin 23 which forms part of a pin-and-slot coupling and extends into an elongated slot 24 provided in a median portion of the lever 12, see particularly FIGS. 1, 2 and 4. One side of the slot 24 is bounded by a follower 25 which is fixed to the swing lever 12 and preferably consists of wear-resistant synthetic plastic material.

Figure 6:
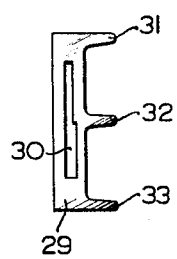
FIG. 6 is an enlarged side elevational view of the claw as seen in the direction of arrow D in FIG. 1.

The film 26 is located in a plane which is substantially parallel to the general planes of the swing levers 12, 22 and is provided with customary perforations 34. The free ends of the levers 12, 22 are adjacent to one side of the film 26 and carry a plate-like claw 29. The claw 29 is formed with an elongated cutout 30, see FIG. 6, which accommodates the end portions of the levers 12, 22, and these levers are respectively provided with prismatic notches 27, 28 to receive portions of the claw 29. In the illustrated embodiment, the claw 29 comprises three equidistant teeth 31, 32, 33 which penetrate into and are withdrawn from the perforations 34 to advance the film at the time they are at least partially accommodated in a series of three adjoining perforations 34. The cutout 30 in the claw 29 is dimensioned in such a way that the material adjacent to the ends of the cutout 30 opposes the bias of the spring 9 which tends to move the free ends of the swing levers 12, 22 away from each other and which also tends to rock the levers about the pin 23. The spring 9 biases the follower 25 against the pin 23.

The film transporting mechanism further comprises an asymmetric combination crown and face cam 35 which is mounted on a drive shaft 36. The shaft 36 is driven in a familiar manner not forming part of this invention. A spring 37 operates between the housing 1 and swing lever 22 and tends to maintain the pin 23 in contact with the peripheral cam face of the cam 35. The axis of the shaft 36 is normal to the axes of the pivots 5 and 16.

Figure 5:
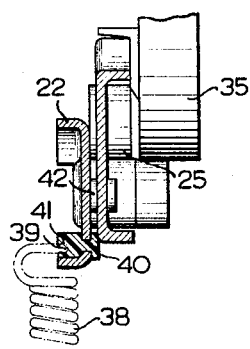
FIG. 5 is a similar enlarged fragmentary vertical section as seen in the direction of arrows from the line V—V of FIG. 1.

The bearing 4 for the lever 22 is supportingly connected with a spring 38 one end portion 39 of which bears against the lever 22. As shown in FIG. 5, the lever 22 is provided with a rotatable insert 40 defining a socket 41 which receives the end portion 39 of the spring 38. The insert 40 preferably consists of wear-resistant synthetic plastic material. The spring 38 has the tendency to swivel the lever 22 in a direction toward the cam 35; consequently, the lever 22 bears against the lever 12 and causes the latter to bear against a second cam face or crown at one side of the cam 35. In other words, the pin 23 is biased against the peripheral cam face of the cam 35, and this face is configurated in such a way that the claw 29 travels in an endless asymmetric path in response to rotation of the shaft 36. The crown of the cam 35 causes the claw 29 to wobble and to move its teeth into and from the perforations 34.

The swing lever 12 carries projections 42, 43 which preferably consist of wear-resistant synthetic plastic material and extend toward the swing lever 22. These projections constitute the sole portions of the lever 12 which come in actual abutment with the lever 22 so that the friction between the two swing levers is reduced to a minimum. The spring 38 serves to keep the projections 42, 43 in abutment with the lever 22.

In order to allow for changes in the position of film frames with reference to the film gate (not shown), the support 2 is adjustably secured to the housing 1. In the illustrated embodiment, the support is provided with elongated slots 45 which receive the stems of screws 44 or similar fasteners. By loosening the screws 44, the operator can change the position of the support 2 with reference to the housing 1 whereupon the screws are driven home with a force which suffices to maintain the support in its newly selected position.

The film transporting mechanism of my invention is set in operation in response to rotation of the drive shaft 36. This shaft rotates the cam 35 which in turn causes the teeth 31–33 to enter into and to be withdrawn from the perforations 34 as well as to advance the film 26 while the teeth 31–33 extend into such perforations. The peripheral face of the cam 35 will cause the claw 29 to advance the film, and the crown of the cam 35 will cause the teeth 31–33 to enter into and to be withdrawn from the perforations 34. The teeth 31–33 travel in an endless path a portion of which is located in the plane of the film 26 and, while travelling in this plane, the teeth 31–33 advance the film by a step.

A very important advantage of my improved film transporting mechanism is that the swing levers 12, 22 are moved by a single asymmetric cam so that the claw 29 can travel in an asymmetric path. The action of this cam 35 is superior to that of a heart cam which must be of constant thickness along the entire periphery thereof. The superior action of the cam 35 results in greatly improved lighting efficiency of the projector in which the mechanism is used.

The springs 37, 38 which bias the pin 23 and the follower 25 against the respective faces of the cam 35 insure that the wear on cooperating parts cannot affect the accuracy of registry between the images of the film strip and the aperture of the film gate. In addition, the springs 37, 38 insure smooth and noiseless movements of the swing levers 12, 22 irrespective of the fact that the moving parts of the film transporting mechanism will undergo at least some wear on continued use of the apparatus. In many conventional film transporting mechanisms, the claw is moved by cams which control all movements of the levers whereas the cam 35 of my improved mechanism cooperates with springs so that movements of the levers 12, 22 are effected partly by the cam 35 and partly by the springs 37, 38. A cam drive which actually produces all movements of the levers will wear away more rapidly than the drive which is utilized in my improved mechanism.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. In a parallel-motion type film transporting mechanism for motion-picture apparatus, a support; a pair of swing levers each having a first and a second end portion; a combined pivot and swivel bearing provided between each of said first end portions and said support; a film-engaging claw connected with the second end portions of said levers; and a pin-and-slot coupling provided between said levers intermediate said first and second end portions thereof.

2. A structure as set forth in claim 1, wherein one of said levers carries at least one projection adjacent to the other of said levers, and further comprising resilient means for biasing said levers against each other so that said projection engages the other lever.

3. A structure as set forth in claim 1, wherein each of said bearings defines a pivot axis and a swivel axis which is normal to said pivot axis, the first end portion of one of said levers being reciprocable in the direction of the respective pivot axis and further comprising resilient means for biasing the second end portions away from each other, the pivot axis for said one lever being parallel with the direction of film transport.

4. A structure as set forth in claim 3, wherein said claw is a toothed plate having an elongated cutout which receives the second end portions of said levers and wherein said resilient means comprises a spring operating between the first end portion of said one lever and the respective bearing for biasing said second end portions against the ends of said cutout.

5. A structure as set forth in claim 4, wherein the second end portions of said levers are provided with prismatic notches receiving portions of said claw.

6. A structure as set forth in claim 3, further comprising a rotary cam adjacent to the median portions of said levers and rotatable about an axis which is normal to said pivot axes, said cam having a peripheral cam face and said coupling comprising a pin affixed to one of said levers and arranged to track the face of said cam.

7. A structure as set forth in claim 6, further comprising second resilient means for biasing said pin against the face of said cam.

8. A structure as set forth in claim 6, wherein said cam comprises a second cam face and further comprising additional resilient means for biasing one of said levers against the other lever and for biasing the other lever against said second cam face so that the second end portions of said levers cause said claw to travel in an endless path whenever said cam rotates.

9. A structure as set forth in claim 8, further comprising a follower rigid with said other lever and arranged to track the second face of said cam, said follower bounding a portion of the slot in said coupling.

10. A structure as set forth in claim 9, further comprising at least one projection provided on one of said levers and adjacent to the other lever and resilient means for biasing said projection against said other lever, said projection and said follower consisting of synthetic plastic material.

11. In a parallel-motion type film transporting mechanism for use in projectors and the like, a support; a pair of combined pivot and swivel bearings mounted on said support, each of said bearings defining a vertical pivot axis and a horizontal swivel axis; a pair of elongated levers each having a first end portion mounted in one of said bearings and a second end portion, one of said first end portions being reciprocable in the direction of the respective pivot axis; a film-engaging claw having a cutout accommodating said second end portions; first resilient means operating between said one first end portion and the respective bearing for biasing said second end portions away from each other and into engagement with said claw; a coupling comprising a pin fixed to a median portion of one of said levers and a pin-receiving slot provided in the other lever, said levers being pivotable about said pin in response to reciprocation of said one first end portion; a rotary asymmetric cam arranged to rotate about a horizontal axis, said cam having a peripheral cam face which is tracked by said pin and a crown; a follower provided on said other lever and arranged to track said crown; and resilient means for biasing said pin and said follower against said cam.

12. In a parallel-motion type film transporting mechanism for use in projectors and the like, a support; a pair of combined pivot and swivel bearings mounted on said support, each of said bearings defining a vertical pivot axis and a horizontal swivel axis; a pair of elongated levers each having a first end portion mounted in one of said bearings and a second end portion, one of said first end portions being reciprocable in the direction of the respective pivot axis; a film-engaging claw having a cutout accommodating said second end portions; first resilient means operating between said one first end portion and the respective bearing for biasing said second end portions away from each other and into engagement with said claw; a coupling comprising a pin fixed to a median portion of one of said levers and a pin-receiving slot provided in the other lever, said levers being pivotable about said pin in response to reciprocation of said one first end portion; a rotary asymmetric cam arranged to rotate about a horizontal axis, said cam having a peripheral cam face which is tracked by said pin and a crown; a follower provided on said other lever and arranged to track said crown; and resilient means for biasing said pin and said follower against said cam, said cam face and said crown being configurated in such a way that said claw performs a wobbling movement in an endless asymmetric path whenever said cam rotates.

13. A structure as set forth in claim 12, wherein said claw is detachable from said levers and comprises a plurality of teeth arranged to extend into the perforations of a film strip while moving along a portion of said endless path so that the film is advanced intermittently.

14. In a motion-picture apparatus having a housing, a parallel-motion type film transporting mechanism comprising a support; fastener means adjustably securing said support to said housing; a pair of combined pivot and swivel bearings mounted on said support, each of said bearings defining a vertical pivot axis and a horizontal swivel axis; a pair of elongated levers each having a first end portion mounted in one of said bearings and a second end portion, one of said first end portions being reciprocable in the direction of the respective pivot axis; a film-engaging claw having a cutout accommodating said second end portions; first resilient means operating between said one first end portion and the respective bearing for biasing said second end portions away from each other and into engagement with said claw; a coupling comprising a pin fixed to a median portion of one of said levers and a pin-receiving slot provided in the other lever, said levers being pivotable about said pin in response to reciprocation of said one first end portion; a rotary asymmetric cam arranged to rotate about a horizontal axis, said cam having a peripheral cam face which is tracked by said pin and a crown; a follower provided on said other lever and arranged to track said crown; and resilient means for biasing said pin and said follower against said cam.

15. A structure as set forth in claim 14, wherein each of said resilient means comprises a helical spring.

16. A structure as set forth in claim 14, wherein one of said levers comprises at least one wear-resistant projection which abuts against the other lever so that the friction between said levers is restricted to friction between said projection and said other lever.

17. A structure as set forth in claim 14, wherein each of said bearings comprises a first pivot and a second pivot journalled in and normal to said first pivot, said first end portions of the levers being rotatably mounted on said second pivots.

References Cited by the Examiner

UNITED STATES PATENTS 2,106,115 1/1938 Debrie _____ 352—194

FOREIGN PATENTS 978,484 4/1951 France.
997,242 1/1952 France.

M. HENSON WOOD, JR., *Primary Examiner.*

A. N. KNOWLES, *Assistant Examiner.*